(12) United States Patent
Cardaropoli

(10) Patent No.: US 9,226,482 B2
(45) Date of Patent: Jan. 5, 2016

(54) APPARATUS FOR PROVIDING FRESH WATER TO FOWL AND METHOD OF MAKING THE SAME

(71) Applicant: The Chicken Fountain, LLC, Davidson, NC (US)

(72) Inventor: Frank Ralph Cardaropoli, Davidson, NC (US)

(73) Assignee: The Chicken Fountain, LLC, Davidson, NC (US)

( * ) Notice: Subject to any disclaimer, the term of this patent is extended or adjusted under 35 U.S.C. 154(b) by 0 days.

(21) Appl. No.: 14/186,459

(22) Filed: Feb. 21, 2014

(65) Prior Publication Data

US 2014/0239215 A1 Aug. 28, 2014

Related U.S. Application Data

(60) Provisional application No. 61/850,736, filed on Feb. 22, 2013.

(51) Int. Cl.
*A01K 39/02* (2006.01)
*A01K 7/06* (2006.01)

(52) U.S. Cl.
CPC .............. *A01K 39/0213* (2013.01); *A01K 7/06* (2013.01)

(58) Field of Classification Search
CPC .............................. A01K 39/0213; A01K 7/06
USPC ........... 251/339; 119/454, 464, 475, 72.5, 72; 222/322, 501
See application file for complete search history.

(56) References Cited

U.S. PATENT DOCUMENTS

| | | | |
|---|---|---|---|
| 2,015,158 A * | 9/1935 | Rosenberg | 222/91 |
| 2,486,729 A | 11/1949 | Beckley | |
| 2,995,308 A * | 8/1961 | Ashkenaz | 239/302 |
| 3,322,101 A | 5/1967 | Eagles et al. | |
| 3,418,977 A | 12/1968 | Godshalk | |
| 4,416,221 A | 11/1983 | Novey | |
| 4,637,345 A * | 1/1987 | Hostetler | 119/72.5 |

(Continued)

OTHER PUBLICATIONS

Cconlystore, "How to install water nipple for chicken", Jun. 11, 2012, YouTube, https://www.youtube.com/watch?v=HML2RQ0gUCk or http://youtu.be/HML2RQ0gUCk.*

(Continued)

*Primary Examiner* — John K Fristoe, Jr.
*Assistant Examiner* — Josephine Trinidad-Borges
(74) *Attorney, Agent, or Firm* — Edwin A. Sisson, Attorney at Law, LLC; Jeffrey J. Banyas

(57) ABSTRACT

This specification discloses an article for providing fresh water to fowl and a method for making the same. The article comprises a valve which is adapted to be attached to a bottle. The valve is adapted to be attached to a bottle by way of a female connection adapter. This specification also discloses a valve comprising a valve body and an actuating mechanism comprising an actuating pin, a receiver pin and a ball. The receiver pin has a thermal conductivity selected from the group of between greater than 50 Btu/(hr-° F.-ft) at 68° F., greater than 100 Btu/(hr-° F.-ft) at 68° F. and greater than 150 Btu/(hr-° F.-ft) at 68° F. The receiver pin also has a length dimension configured so that greater than about 25%, greater than about 35%, greater than about 50%, greater than about 75% or greater than about 90% of the receiver pin length extends beyond the receiver first end when the valve is closed.

6 Claims, 10 Drawing Sheets

(56) References Cited

U.S. PATENT DOCUMENTS

| | | | |
|---|---|---|---|
| 4,829,933 A | | 5/1989 | Van der Veer |
| 4,984,537 A | | 1/1991 | Steudler, Jr. |
| 5,020,770 A | * | 6/1991 | Moberg .................. 249/111 |
| 5,193,485 A | * | 3/1993 | Hostetler ................ 119/72.5 |
| 5,301,635 A | * | 4/1994 | Rovira Badia et al. ...... 119/72.5 |
| 5,522,346 A | * | 6/1996 | Clark, IV ................ 119/72.5 |
| 6,058,881 A | | 5/2000 | Thompson |
| 6,308,657 B1 | | 10/2001 | Schumacher et al. |
| 6,748,899 B1 | * | 6/2004 | Momont et al. ............. 119/72.5 |
| 7,051,676 B1 | * | 5/2006 | Deshaies .................... 119/75 |
| 2010/0116213 A1 | * | 5/2010 | Cahill ..................... 119/72.5 |

OTHER PUBLICATIONS

Google search of terms "water bottle chicken feeder", delimited by published dates before Feb. 21, 2012 https://www.google.com/search?q=water+bottle+chicken+feeder&es_sm=122&tbs=cdr:1,cd_max:02/21/2012&source=lnms&tbm=isch&sa=X&ei=wSKSVJrvls3GsQTI5oHQAQ&ved=0CAgQ_AUoAQ&biw=1182&bih=1221#imgdii=_.*

NPL #3: Farnette1769'S Blog; Poultry Water System for Small Flocks; Jan. 27, 2011; https://farmette1769.wordpress.com/2011/01/27/poultry-water-system-for-small-flocks/.*

NPL #4: Antimicrobial Copper; A Guide to Working With Copper and Copper Alloys; Sep. 2009; www.copper.org/publications/pub_list/pdf/a1360.pdf.*

* cited by examiner

APPARATUS FOR PROVIDING FRESH WATER TO FOWL AND METHOD OF MAKING THE SAME

CROSS REFERENCES AND PRIORITIES

This application claims priority from U.S. Provisional Application No. 61/850,736 filed on 22 Feb. 2013 and U.S. Provisional Application No. 61/942,746 filed on 21 Feb. 2014 the teachings of both of which are incorporated herein by reference.

BACKGROUND

Providing a fresh source of water for chickens, ducks, guinea hens and other fowl is a significant concern for many farmers. The simplest method of providing fresh water involves placing buckets, bowls or troughs of water into the pen, brooder or other holding area. This simple approach has been used for many years, but it requires regular flushing, cleaning and re-filling of the bucket, bowl or trough. If the bucket, bowl or trough is not flushed, thoroughly cleaned and re-filled on a regular basis the stagnant water becomes dirty, can be contaminated with fecal matter and can be overrun by bacteria and insects that can transmit serious diseases to the fowl. This is of particular concern for young fowl that are kept and raised in a brooder containing a fresh water source where the young fowl are more likely to soil the water source and are more susceptible to disease. Additionally, buckets, bowls and troughs of water can freeze in cold temperatures requiring a time consuming process of thawing or breaking up the frozen water to give the fowl access to drinkable water.

Some have proposed an article that provides a self contained water source that can be released through a valve into a common trough when actuated by the fowl. One such device is proposed in U.S. Pat. No. 4,829,933 to Van der Veer and comprises a float operated actuater for a drinking nozzle that is manually actuated to release water into a drinking trough. This approach suffers in that once the water is released to the common trough it can become contaminated with dirt, bacteria and fecal matter.

Other have proposed an article which is completely self contained and provides water to when actuated by the fowl. Articles have existed at least since the 1940's for providing water to fowl through a self contained system. These systems generally make use of a valve or a series of valves which can be actuated by the fowl to release a flow of water.

For instance, U.S. Pat. No. 2,486,729 to Beckley describes a poultry-watering device comprising a water pipe connected to a low pressure water supply system with a series of fitted fixtures that are sensitive to the contact of the fowl.

U.S. Pat. No. 3,322,101 to Eagles et al. describes a nozzle having a nipple that is attached to an unknown source of water. An animal contacts the nipple, opening the valve and permitting water to flow out of the valve.

U.S. Pat. No. 3,418,977 to Godshalk describes a poultry watering device comprising a rigid valve body member inserted through a port in an elongated conduit. The fowl pushes upwardly with its beak against the valve to unseat the valve element and permit the flow of water through the valve.

U.S. Pat. No. 4,416,221 to Novey describes a nipple type waterer and valve having an end fitting accessible to an animal with the tip being in the form of a nipple that can be displaced laterally to open the valve.

U.S. Pat. No. 4,984,537 to Steudler, Jr. describes a nipple drinker including a passage, a ball valve which closes the passage when seated and a ball valve actuating stem having a head and a pin. Fowl can actuate a stem to unseat the ball valve to initiate water flow.

U.S. Pat. No. 6,058,881 to Thompson describes a watering valve for birds and small animals having a spring biased metering pin with a tubular actuator stem. The bird or animal applies a demand force to the actuator stem to displace the stem and initiate water flow.

U.S. Pat. No. 6,308,657 to Schumacher et al. describes a drinking valve having a casing, an acceptance part, a connecting part and a snap-in connection.

SUMMARY

Disclosed in this specification is an article comprising a female connection adapter and a valve wherein the female connection adapter comprises a female connection adapter top, a female connection adapter cylinder and a female connection adapter hole wherein the female connection adapter top has a top surface and a bottom surface, the female connection adapter cylinder has an outer wall and an inner wall where the inner wall has female threads, and the female connection adapter hole passes from the top surface through the bottom surface; the valve comprises a receiver comprising a receiver first end, a receiver second end, and a receiver hole wherein the receiver hole passes through the receiver from the receiver first end to the receiver second end; a valve cap, comprising a valve cap first end, a valve cap second end, and a valve cap hole; and a self-sealing actuating mechanism which opens the valve when an actuating force is applied to the actuating mechanism and automatically closes the valve when the actuating force is released, wherein the receiver second end is attached to the valve cap first end and the valve is attached to the female connection adapter so that the female connection adapter hole is aligned with the receiver hole and the valve cap hole.

In one embodiment the receiver second end has female threads, the valve cap first end has male threads and the receiver second end female threads are mated to the valve cap first end male threads.

In one embodiment the receiver first end has male threads, and the receiver first end male threads are mated to the female connection adapter hole. In another embodiment the receiver is joined to the female connection adapter in a unitary manner. In still another embodiment the female connection adapter further comprises a protrusion extending vertically from the top surface of the female connection adapter top having male threads and, the receiver hole has female threads at the receiver first end, and the female threads of the receiver hole are mated to the male threads of the female connection adapter protrusion.

In one embodiment the article further comprises a bottle wherein the bottle comprises a first end and a second end wherein the bottle first end has male threads on the outer edge of the bottle first end and the male threads of the bottle first end are mated to the female threads of the female connection adapter cylinder. In one embodiment the bottle comprises a vent hole.

In one embodiment the self-sealing actuating mechanism comprises an actuating pin comprising an actuating pin end, and an actuating pin head which are located on opposing ends of the actuating pin wherein the actuating pin has an actuating pin length dimension; and a ball wherein the actuating pin end passes through the valve cap hole, the actuating pin head is located between the valve cap first end and the ball and the ball is located between the receiver first end and the actuating pin head.

In one embodiment the self-sealing actuating mechanism further comprises a receiver pin comprising a receiver pin end and a receiver pin head which are located on opposing ends of the receiver pin wherein the receiver pin has a receiver pin length dimension, the receiver pin end passes through the receiver hole, the receiver pin head is located between the receiver first end and the receiver second end and the ball is located between the receiver pin head and the actuating pin head.

In one embodiment the receiver pin length dimension is selected so that the receiver pin extends beyond the receiver first end when the valve is in the closed position. In one embodiment the amount of the receiver pin length dimension that extends beyond the receiver first end when the valve is in the closed position is selected from the group consisting of greater than about 25% of the receiver pin length, greater than about 35% of the receiver pin length, greater than about 50% of the receiver pin length, greater than about 75% of the receiver pin length and greater than about 90% of the receiver pin length.

In one embodiment the receiver pin has a thermal conductivity greater than 50 Btu/(hr-° F.-ft) at 68° F. In another embodiment the receiver pin has a thermal conductivity greater than 100 Btu/(hr-° F.-ft) at 68° F. In still another embodiment the receiver pin has a thermal conductivity greater than 150 Btu/(hr-° F.-ft) at 68° F.

In one embodiment the receiver pin comprises more than 90% copper by weight. In another embodiment the receiver pin comprises more than 99% copper by weight. In still another embodiment the receiver pin is made of 100% copper by weight.

Also disclosed in this specification is a valve comprising a valve body and an actuating mechanism wherein the valve body comprises a receiver and a valve cap wherein the receiver comprises a first end, a second end and a receiver hole wherein the receiver hole passes through the receiver hole from the receiver first end to the receiver second end; and the valve cap comprises a first end, a second end and a valve cap hole the actuating mechanism has an actuating pin comprising an actuating pin end, and an actuating pin head which are located on opposing ends of the actuating pin wherein the actuating pin has an actuating pin length dimension; a receiver pin comprising a receiver pin end and a receiver pin head which are located on opposing ends of the receiver pin wherein the receiver pin has a receiver pin length dimension; and a ball wherein the receiver second end is attached to the valve cap first end, the receiver pin length dimension is configured so that the receiver pin extends beyond the receiver first end when the valve is in the closed position, and the receiver pin is made of a material having a thermal conductivity selected from the group of between greater than 50 Btu/(hr-° F.-ft) at 68° F., greater than 100 Btu/(hr-° F.-ft) at 68° F. and greater than 150 Btu/(hr-° F.-ft) at 68° F.

In one embodiment the amount of the receiver pin length dimension that extends beyond the receiver first end when the valve is in the closed position is selected from the group consisting of greater than about 25% of the receiver pin length, greater than about 35% of the receiver pin length, greater than about 50% of the receiver pin length, greater than about 75% of the receiver pin length and greater than about 90% of the receiver pin length.

In one embodiment the receiver pin comprises more than 90% copper by weight. In another embodiment the receiver pin comprises more than 99% copper by weight. In still another embodiment the receiver pin is made of 100% copper by weight.

Also disclosed in this specification is a method of attaching the valve to the female connection adapter of the article of any of claims 1 to 17 comprising the steps of:

A) creating the female connection adapter having the female connection adapter hole, and B) mating the valve into the female connection adapter hole.

In one embodiment of the method the female connection adapter is a bottle cap and the female connection adapter hole is created by drilling a hole in the bottle cap.

In one embodiment of the method the valve has male threads on the first end, the diameter of the female connection adapter hole is slightly smaller than the diameter of the valve, the valve is made of a material which is harder than the material the female connection adapter is made of and the mating of the valve with the female connection adapter hole is accomplished by threading the valve into the female connection adapter hole wherein the male threads of the valve cut female threads into the female connection adapter hole.

In one embodiment the method comprises the further step of putting female threads onto the female connection adapter hole prior to mating the valve with the female connection adapter hole.

In one embodiment of the method a portion of the valve is joined to the female connection adapter in a unitary manner.

DETAILED DESCRIPTION

The current application is directed to a watering valve for fowl which is adapted to fit to a standard, commercially available bottle, thereby eliminating the need for large, complex water storage and supply systems known in the art.

Figure 1:
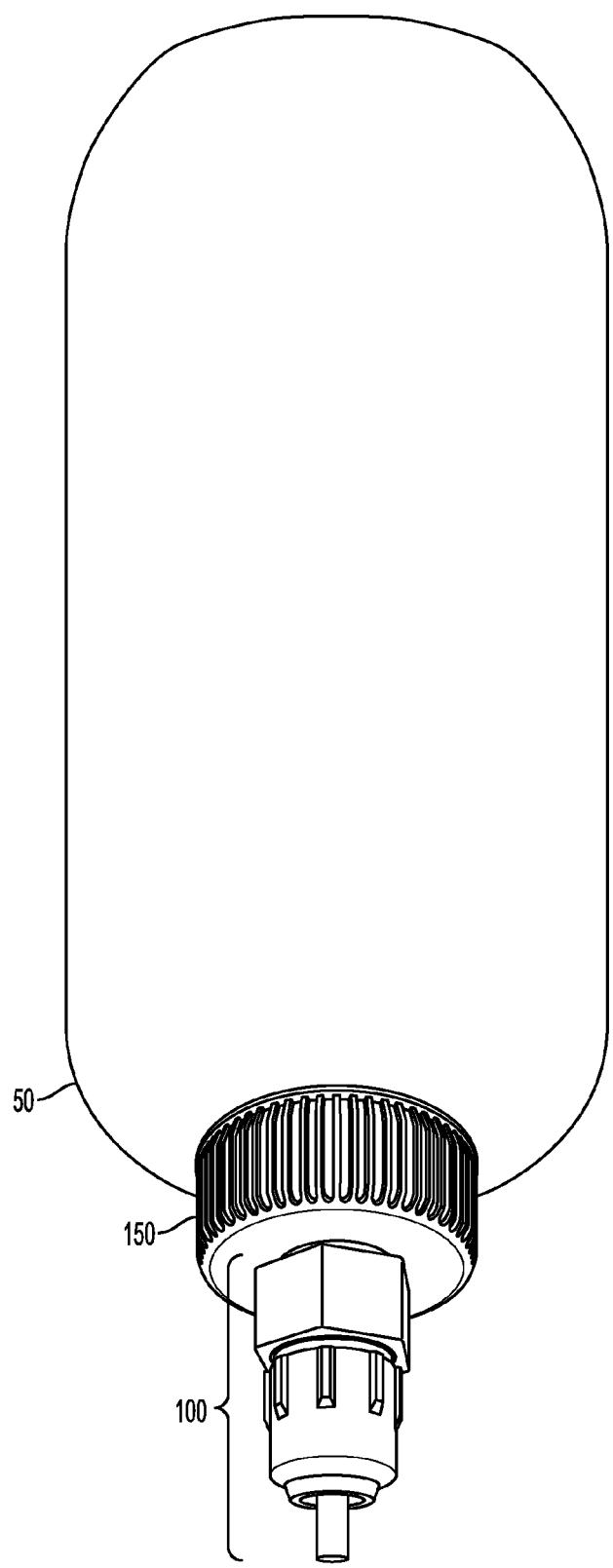
FIG. 1 is a perspective view of one embodiment of the article described herein.

This specification discloses an article for providing fresh water to fowl wherein the article is a valve which is adapted to be attached to a bottle, preferably a soft drink bottle. As it is known in the art, a soft drink bottle has a body, a neck and a filling end which is open to the inside of the bottle having threads on the outer edge of the filling end. FIG. 1 demonstrates the valve (100) adapted to and attached to soft drink bottle (50) using a female connection adapter (150).

Figure 2:
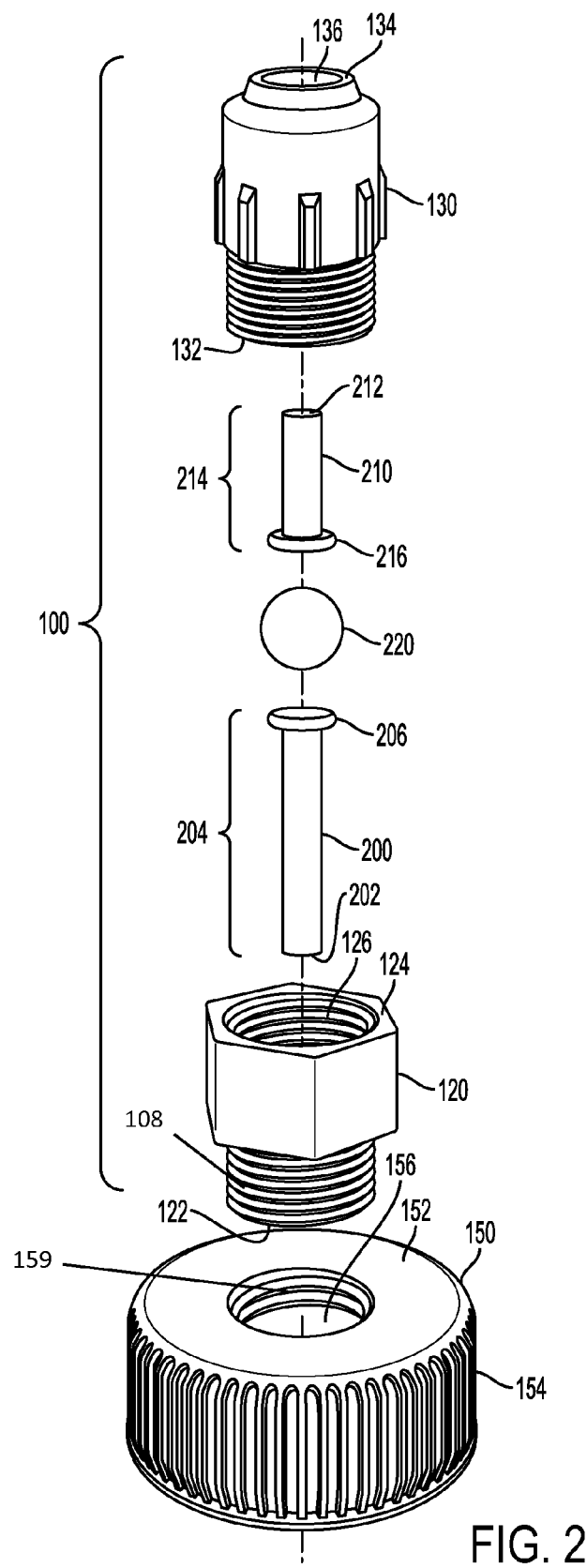
FIG. 2 is an exploded perspective view of an embodiment of the article described herein.

As shown in FIG. 2, the female connection adapter (150) has a female connection adapter top (152), a female connection adapter cylinder (154), and a female connection adapter hole (156). As further indicated in FIGS. 6-10, the female connection adapter top has a top surface (152A) and a bottom surface (152B). Returning to FIG. 2, the female connection adapter hole passes from the top surface through the bottom surface. As indicated in FIGS. 6-9, the inner wall of the female connection adapter cylinder is circular in shape with female threads (158) rotating around the inner wall of the female connection adapter cylinder to allow the female connection adapter to be mated to the male threads on the bottle. The shape of the outer wall of the female connection adapter cylinder is not considered important.

In this specification and in the claims, the terms "mated to" or "mated with" are synonymous when discussing the threads of one component mated to or mated with the threads of another component. The term "mated to" or "mated with" means that the threads of the two components are appropriately designed in terms of pitch, threads per inch, thread width and thread depth so that the two components are firmly connected with each other meaning that there is no looseness or play when the components are pushed and then pulled in opposing directions. In terms of the art, phrases such as "tight fit", "snug fit", "torqued" and "tightened" can be used to describe when the threads of the two components are mated to or mated with one another.

Male threads are those threads which are on the outer surface of a cylindrical component. Female threads are those threads which are on the inner surface of a cylindrical component. When mated, the outside diameter of the cylinder having the male threads, not including the depth of the male threads, is less than the inside diameter of the cylinder having the female threads, not including the depth of the female threads.

The valve (100) may be attached to the female connection adapter (150) in a number of ways. As shown in the embodiment of FIG. 2, the female connection adapter hole has female threads (159) and the outer surface of one of the valve ends has male threads (108). In such an embodiment, the male threads of the outer surface of the valve end are mated to the female threads of the female connection adapter hole. In one embodiment the female connection adapter hole is pre-threaded before mating the male threads of the outer surface of the valve end to the female threads of the female connection adapter hole. In another embodiment the female connection adapter hole is not pre-threaded. In such an embodiment the material of the valve is harder than the material of the female connection adapter and acts as a self-tapping screw the male threads of which cut or create the female threads in the female connection adapter hole as the male threads of the valve end are advanced through the female connection adapter hole. Thus, the female connection adapter hole's female threads are created by the male threads of the valve end.

As shown in FIG. 2, the male threads of the valve end that are mated with the female threads of the female connection adapter hole are part of the receiver (120). As can be seen, the receiver has a receiver first end (122), a receiver second end (124) and a receiver hole (126). The inside of the receiver is threaded with female threads on the inside wall of the receiver at the receiver second end to be mated to the male threads of the valve cap first end (132).

Figure 9:
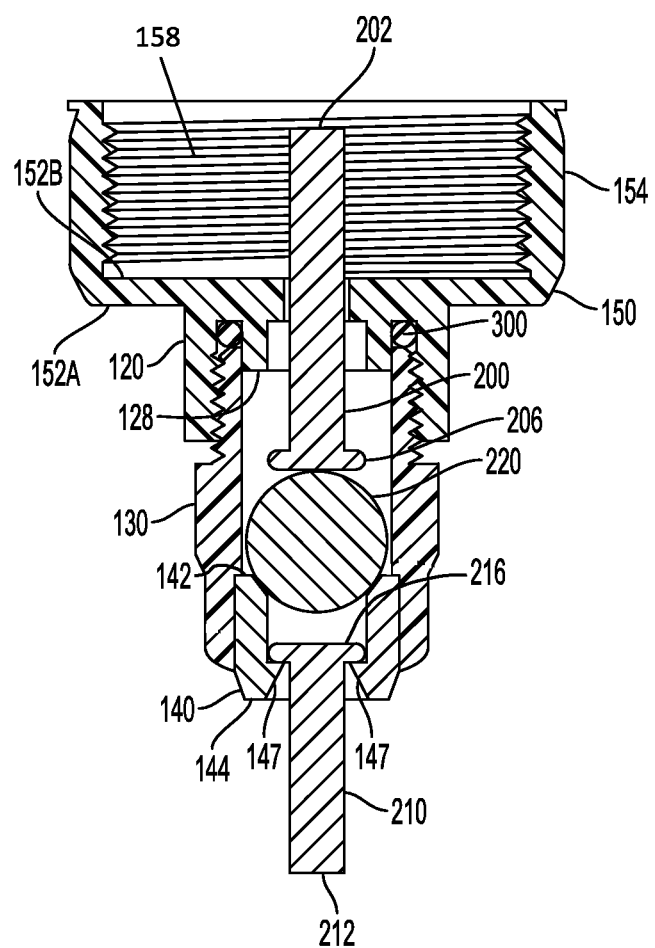
FIG. 9 is cut away view of an embodiment of the article described herein.
Figure 10:
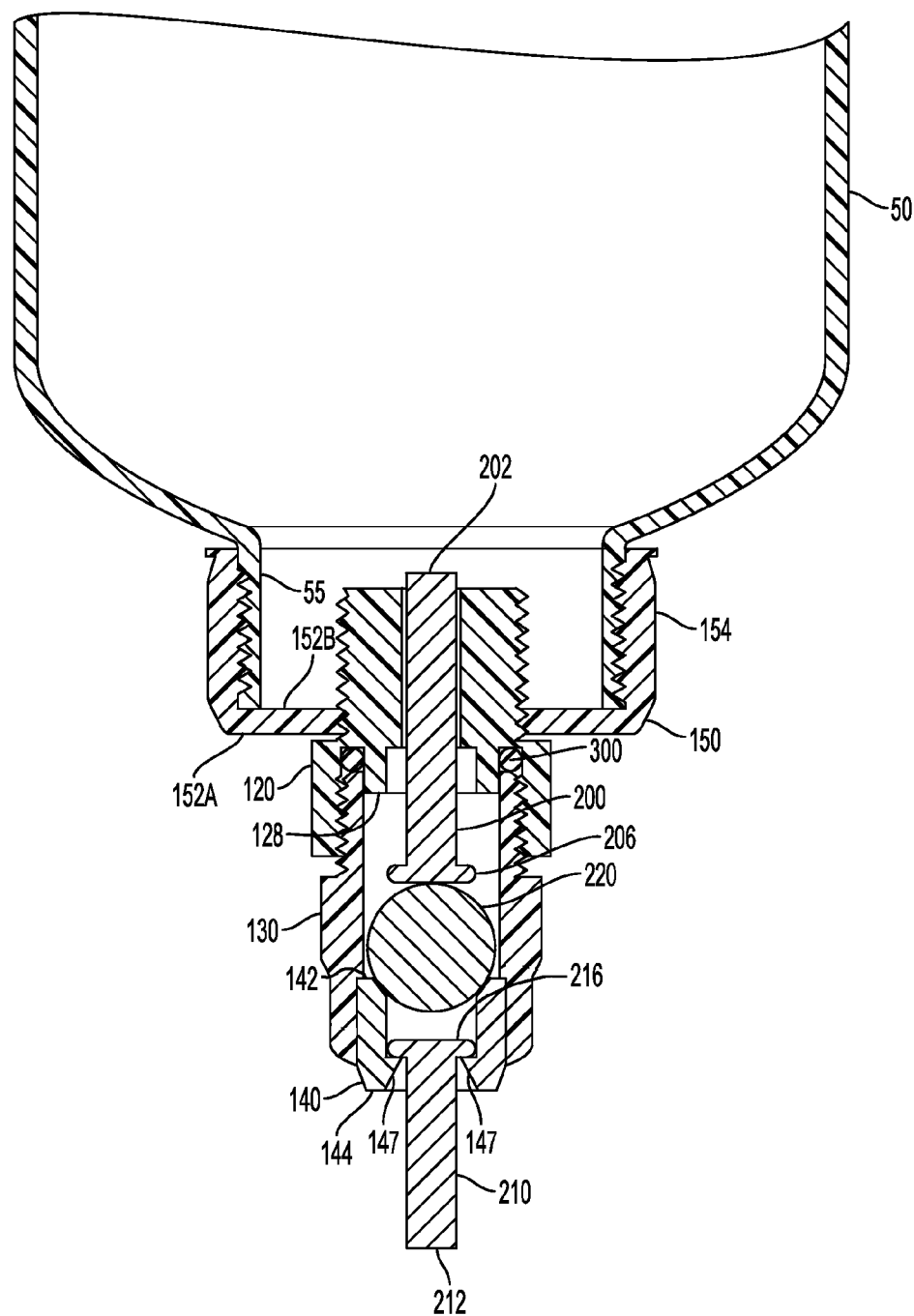
FIG. 10 is cut away view of an embodiment of the article described herein.

As shown in FIG. 9, in one embodiment a portion of the valve (120) is joined in a unitary manner to the female connection adapter. This embodiment can be achieved by injection molding.

In a preferred embodiment the female connection adapter also comprises a liner or a gasket abutting against the bottom surface of the female connection adapter top. The liner or gasket is used to create a better seal and prevent leakage when the female connection adapter is mated to the bottle. Typical materials for use in the liner or gasket include low-density polyethylene and polyvinylchloride.

The valve (100) can be any waterer valve known in the art and those yet to be invented. Examples of valves considered useful for the current invention include those disclosed in U.S. Pat. No. 3,322,101 to Eagles et al., U.S. Pat. No. 3,418,977 to Godshalk, U.S. Pat. No. 4,416,221 to Novey, U.S. Pat. No. 4,984,537 to Steudler, Jr., U.S. Pat. No. 6,058,881 to Thompson and U.S. Pat. No. 6,308,657 to Shumacher et al., the teachings of each of which are incorporated herein by reference. It is preferred that the valve not be of a design which requires a squeezing force to actuate the flow of water, such as a baby bottle nipple. Preferably the valve has a self-sealing actuating mechanism which opens the valve when an actuating force is applied to the actuating mechanism and automatically closes the valve when the actuating force is released. Examples of such an actuating mechanism are disclosed in U.S. Pat. No. 4,984,537 to Steudler, Jr. having a ball valve closing the passage when seated on at least one valve seat, and a ball valve actuating stem having a head and a pin, whereby small and large fowl and/or animals can actuate the stem to unseat the ball valve in proportion to the force applied to the stem.

The bottle can be any commercially available bottle and can come in a variety of sizes. The bottle is preferably made of a plastic material such as polyethylene terephthalate, polyvinyl chloride, high density or low density polyethylene, polypropylene, or polycarbonate. The bottle could also be made of glass or metal. The bottle will have a first end and a second end. The bottle first end is opposite of the bottle second end. The size of the bottle is not considered important, but can be any of the commercially available bottle sizes such as 0.35 liters, 0.59 liters, 0.71 liters, 1 liter and 2 liters. Preferably the first end of the bottle has male threads (55) which the female threads of the inner wall of the female connection adapter cylinder can be mated to. In one embodiment there is a vent hole in the second end of the bottle which allows the bottle to vent when filled in its inverted position.

Figure 4:
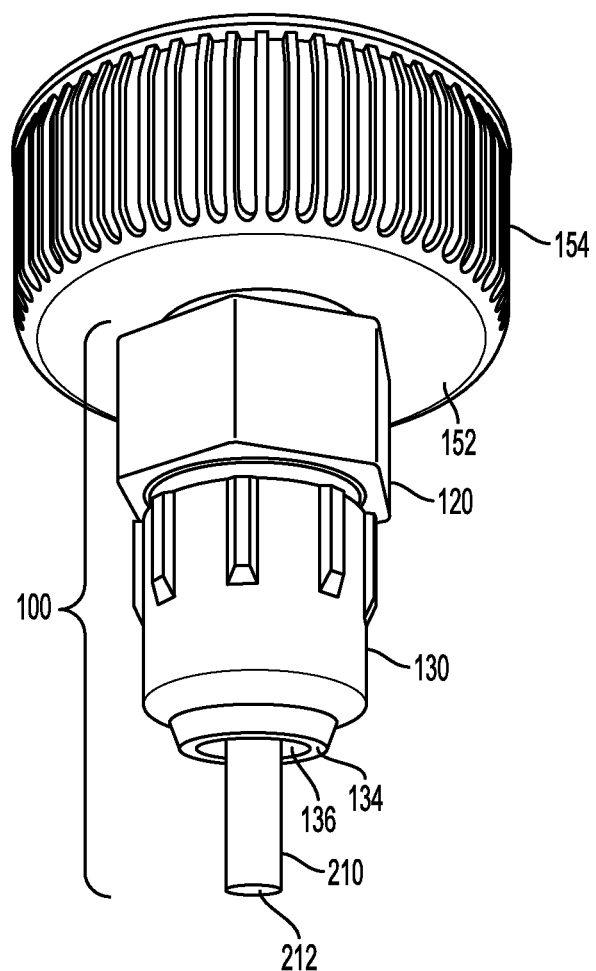
FIG. 4 is an assembled perspective view of an embodiment of the article described herein.

A preferred embodiment can be made using a bottle cap as the female connection adapter as shown in FIG. 2. In one embodiment the bottle cap is a re-used bottle cap from an existing commercial soft drink or juice bottle. Typically the bottle cap will be made of polypropylene or polyethylene. In the shown embodiment of FIG. 4, the article comprises a female connection adapter (150) which is a bottle cap, and a valve (100). The bottle cap and valve can be connected to a commercially available bottle (50) which is filled with water to provide a source of water to fowl.

Figure 3:
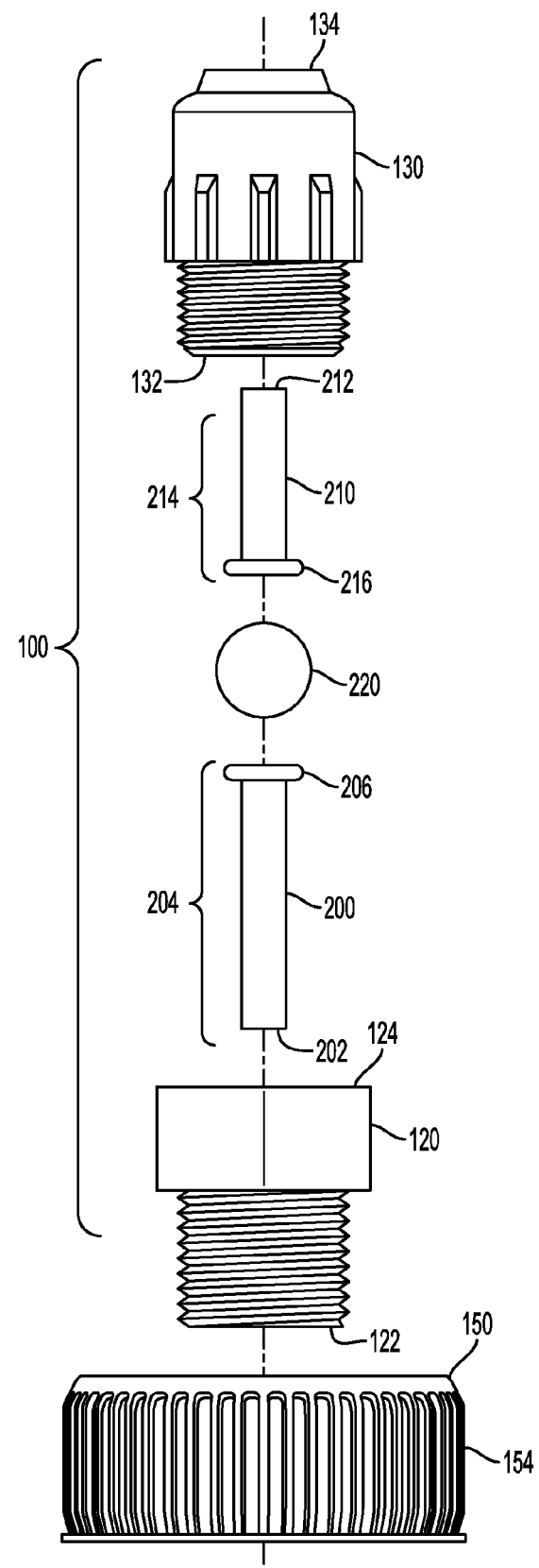
FIG. 3 is an exploded side view of an embodiment of the article described herein.

In a preferred embodiment, the valve (100) has a receiver (120), a valve cap (130), and an actuating mechanism. An actuating mechanism is the specific valve configuration and components which allows the flow of water to be turned on and off. In one embodiment shown in FIG. 3, the actuating mechanism comprises a receiver pin (200), an actuating pin (210) and a ball (220).

Figure 6:
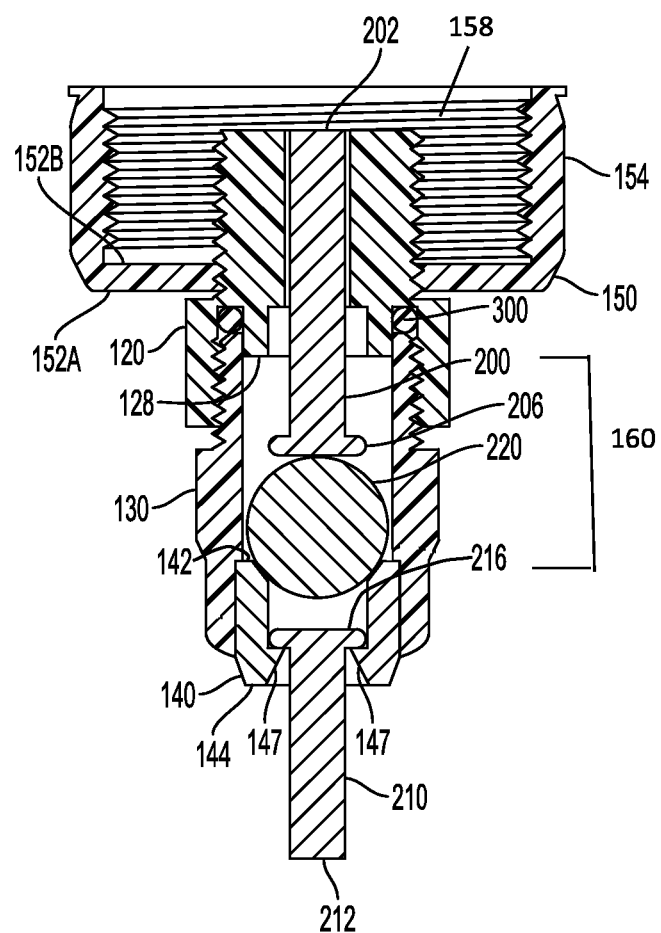
FIG. 6 is a cut away view of an embodiment of the article described herein.

In the preferred valve embodiment the receiver (120) has a first end (122), a second end (124) and a receiver hole (126) having a receiver hole diameter. The receiver hole passes through the receiver from the receiver first end to the receiver second end. In one embodiment the receiver hole has a first receiver hole diameter at the receiver first end and a second receiver hole diameter at the receiver second end where the second receiver hole diameter is greater than the first receiver hole diameter. In an embodiment of the preferred valve where a portion of the valve is attached in a unitary manner to the female connection adapter, the receiver may be molded into the female connection adapter such as by injection molding as shown in FIG. 9. In another embodiment of the preferred valve, the outer edge of the receiver first end has male threads and the female connection adapter hole (156) has female threads as shown in FIG. 6. In such an embodiment, the male threads of the outer edge of the receiver first end are mated to the female threads of the female connection adapter hole. When the receiver is attached to the female connection adapter, the female connection adapter hole will be aligned with the receiver hole.

In another embodiment of the preferred valve, the inner edge of the receiver first end has female threads and the female connection adapter comprises a protrusion having male threads. In such an embodiment, the female threads of the inner edge of the receiver first end are mated to the male threads of the protrusion.

In one embodiment of the preferred valve the inner surface of the receiver hole has female threads at the receiver second end as shown in FIG. 6. In another embodiment of the preferred valve, the outer surface of the receiver second end has male threads. The receiver hole further comprises a receiver pin seat (128) having a receiver pin seat diameter. The receiver pin seat acts as a stop to prevent the receiver pin from advancing further into the receiver.

The receiver may further comprise a gasket ridge in which a gasket or o-ring (300) may be seated.

In the preferred valve embodiment the valve cap (130) has a first end (132), a second end (134) and a valve cap hole (136) having a valve cap hole diameter. The valve cap hole passes through the valve cap from the valve cap first end to the valve cap second end. In one embodiment the valve cap hole has a first valve cap hole diameter at the valve cap first end and a second valve cap hole diameter at the valve cap second end where the first valve cap hole diameter is greater than the second valve cap hole diameter. Preferably, the first valve cap hole diameter is substantially the same as the second receiver hole diameter such that the receiver second hole diameter and the valve cap first diameter form a valve cavity in the shape of a cylinder (160). In one embodiment of the preferred valve, the outer surface of the valve cap first end has male threads and the inner surface of the receiver second end has female threads as shown in FIG. 6. In such an embodiment the male threads of the outer surface of the valve cap first end are mated to the female threads of the inner surface of the receiver second end. In a further embodiment of the preferred valve, the inner surface of the valve cap hole has female threads at the valve cap first end and the outer surface of the receiver second end has male threads. In such an embodiment, the female threads of the inner surface of the valve cap first end are mated to the male threads of the outer surface of the receiver second end. In the preferred valve embodiment the valve cap hole passes from the first end of the valve cap through the second end of the valve cap. The valve cap hole may be countersunk at the valve cap second end. The valve cap hole may further have an actuating pin seat (138) having an actuating pin seat diameter. The valve cap hole may further have a valve cap ball seat (139) having a valve cap ball seat diameter. By using a valve cap ball seat and an actuating pin seat, two seals are provided to prevent water from leaking when the valve is in the closed position.

In one embodiment of the preferred valve there may be a seal (300) between the receiver and the female connection adapter. There may also be a seal between the receiver and the valve cap. The seal may be created by any known substance or article capable of forming a seal such as a washer, an o-ring, a grommet, use of a tape sealant such as Teflon® tape or through the use of an adhesive substance such as silicon.

In one embodiment of the preferred valve the valve cap further comprises a valve cap insert (140) having a first end (142), a second end (144) and a hole having a valve cap insert hole diameter. The valve cap insert hole diameter at the valve cap insert first end may be different than the valve cap insert hole diameter at the valve cap insert second end. The valve cap insert is inserted into the valve cap hole with the valve cap insert first end corresponding to the valve cap first end and the valve cap insert second end corresponding to the valve cap second end. The valve cap insert hole passes from the first end of the valve cap insert through the second end of the valve cap insert. The valve cap insert hole may be countersunk at the valve cap insert second end as shown in (147) of FIG. 6. The valve cap insert hole further has an actuating pin seat. The valve cap insert hole further has a valve cap insert ball seat (139) having a valve cap insert ball seat diameter. The valve cap insert is preferably comprised of a metal material, preferably stainless steel to avoid rusting.

In the preferred valve embodiment the receiver pin preferably has a receiver pin end (202) and a receiver pin head (206) which are located on opposing ends of the receiver pin and the receiver pin has a receiver pin length dimension (204), a receiver pin diameter and a receiver pin head diameter. The actuating pin preferably has an actuating pin end (212) and an actuating pin head (216) which are located on opposing ends of the actuating pin and the actuating pin has an actuating pin length dimension (214), an actuating pin diameter and an having an actuating pin head diameter. The receiver pin diameter is generally slightly smaller than the first receiver hole diameter such that the receiver pin may pass through the first receiver hole. The receiver pin head diameter is larger than the first receiver hole diameter, but generally slightly smaller than the receiver pin seat diameter and smaller than the receiver second hole such that the receiver pin head may seat in the receiver pin seat without passing through the first receiver hole. The actuating pin diameter is generally slightly smaller than the second valve cap hole such that the actuating pin may pass through the second valve cap hole. The actuating pin head diameter is larger than the valve cap hole diameter, but generally slightly smaller than the actuating pin seat diameter and smaller than the first valve cap hole diameter such that the actuating pin head may seat in the actuating pin seat without passing through the valve cap hole. The ball is preferably spherical in shape having a ball diameter. In a preferred embodiment, the ball diameter is generally slightly smaller than the valve cavity diameter, but larger than the receiver pin head diameter and the actuating pin head diameter. It is further preferred that the ball diameter is larger than the ball seat diameter such that the ball may seat in the ball seat of the valve cap or valve cap insert. When the ball is non-spherical (such as an elliptical ball), the ball diameter refers to the minor axis of the ball.

Figure 7:
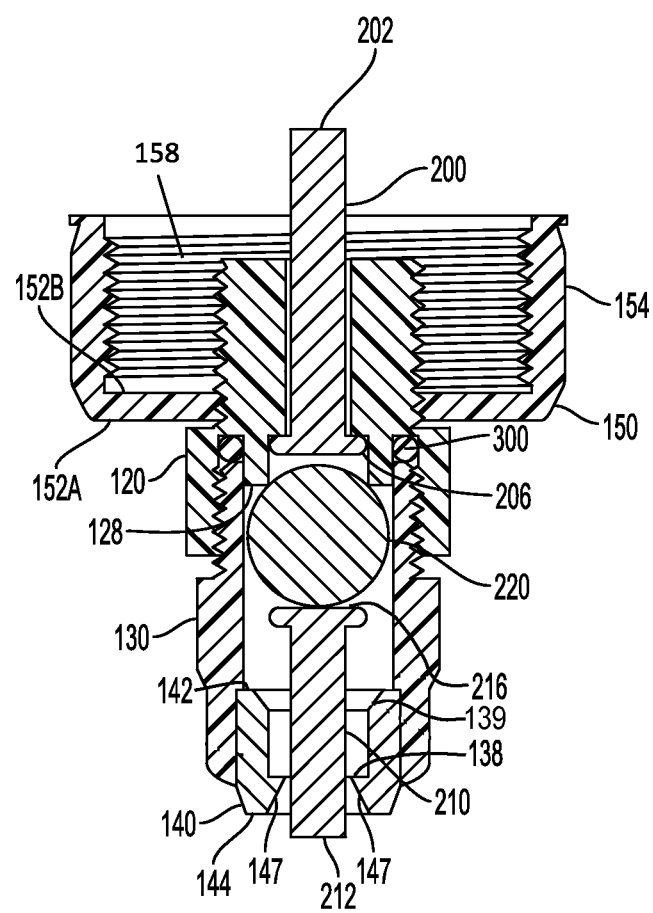
FIG. 7 is a cut away view of an embodiment of the article described herein.
Figure 8:
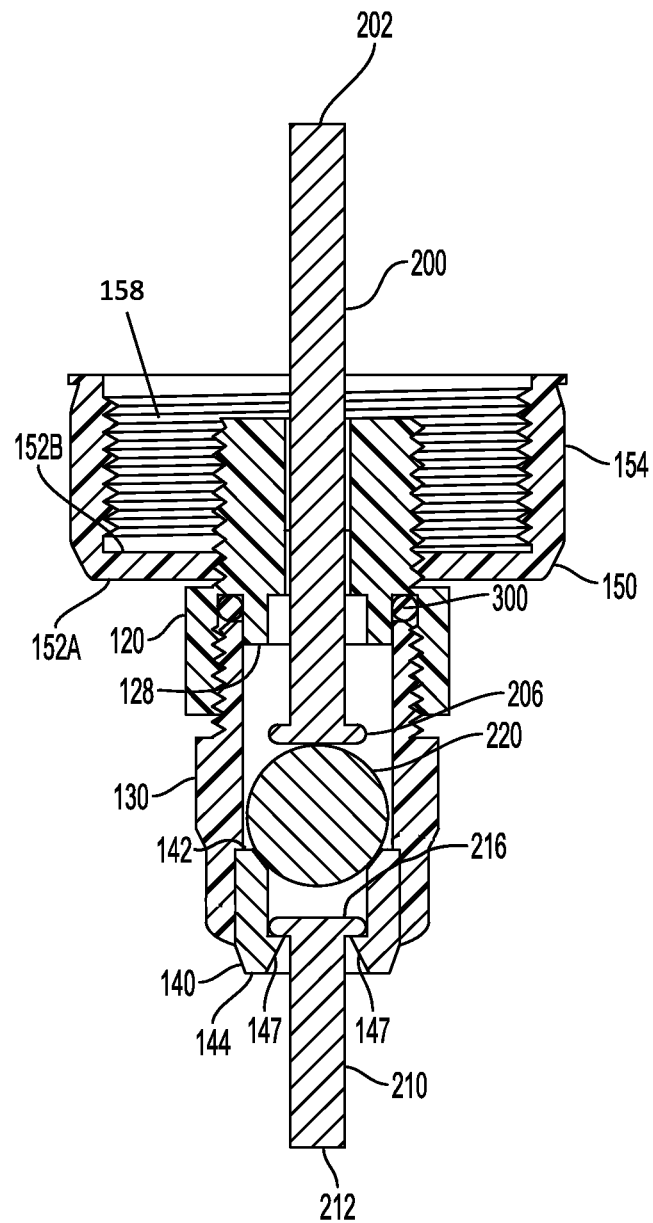
FIG. 8 is cut away view of an embodiment of the article described herein.

As shown in FIG. 7, the receiver pin end (202) passes through the first receiver hole with the receiver pin head (206) lying inside the receiver pin seat. The actuating pin end (212) passes through the valve cap hole with the actuating pin head (216) lying inside the valve cavity. The ball (220) lies between the receiver pin head and the actuating pin head.

Figure 5:
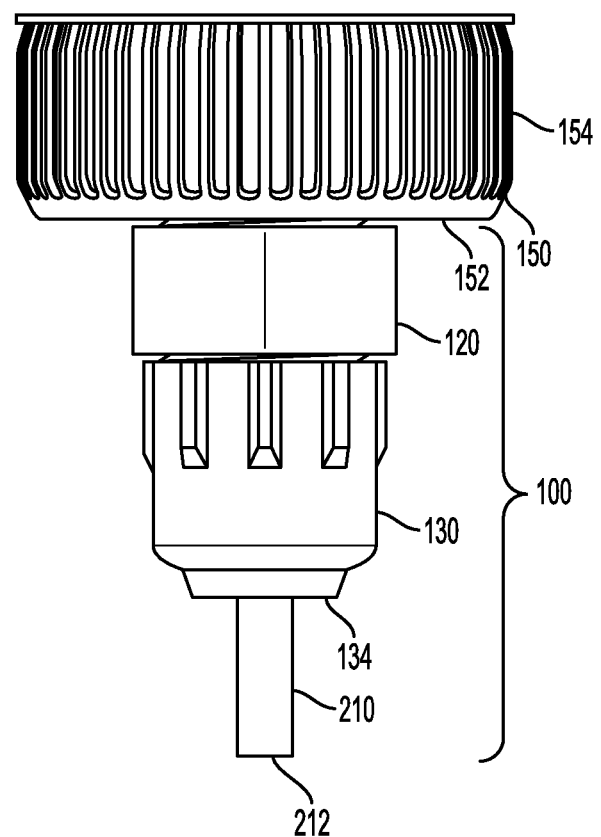
FIG. 5 is an assembled side view of an embodiment of the article described herein.

FIG. 5 shows a side view of the assembled article including the female connection adapter (150) having the female connection adapter cylinder (154), the receiver (120) and the valve cap (130) of the valve (100) and the actuating pin (210).

In a preferred method, the article can be manufactured by inserting the assembled valve into the female connection adapter hole. The assembled valve comprises a receiver having male threads on the first end. The female connection adapter hole may be created by drilling a hole into the top surface of the female connection adapter, or by molding the female connection adapter with a hole in the top surface. The hole is preferably smaller in diameter than the outer diameter of the receiver first end. The receiver is preferably made of a material which is harder than the material the female connection adapter is made of. The receiver has a first end and a second end where the first end of the receiver has male threads. The receiver is then threaded into the bottle cap hole and the receiver acts as a self-tapping screw which cuts female threads into the bottle cap hole.

The valve can be inserted into the female connection adapter as a disassembled valve. If the valve is inserted into the female connection adapter as a disassembled valve, after threading the receiver into the bottle cap hole, the receiver pin is placed into the receiver hole with the receiver pin head sitting in the receiver pin seat. The ball is placed on top of the receiver pin head. The actuating pin is placed into the valve cap with the actuating pin head sitting in the actuating pin seat. The valve cap first end is then mated to the receiver second end. The bottle is then filled at least partially full with water and the bottle cap is mated to the threaded neck of the bottle. The bottle is then mounted or hung in a chicken coop or brooder in a substantially vertical orientation with the valve facing the bottom of the coop or brooder.

In one embodiment, the force of the water pushes the valve into the valve closed position. For example, if the valve is as described in the preferred embodiment, the force of the water is applied to the receiver pin end which forces the ball against the actuating pin head, seating the actuating pin head into the actuating pin seat of the valve cap or the valve cap receiver which closes the valve shutting off the flow of water out of the valve. When the valve is in the valve closed position the actuating pin end protrudes out of the valve cap hole while the actuating pin head is seated in the valve seat and the ball is seated in the ball seat. This is known as the valve closed position and is shown in FIG. 6. The fowl will then apply pressure to the actuating pin end by pecking, typically with their beak, moving the actuating pin head out of the actuating pin seat and the ball out of the ball seat and releasing water out of the valve. This is known as the valve opened position. Because the water is self-contained in the bottle it is less susceptible to being contaminated with dirt, fecal matter or bacteria. In a preferred embodiment, the water flowing from the valve does not drip into a common bowl or trough and in fact the preferred method for watering the fowl is to do so in the absence of a common bowl or trough which may or may not be attached to the assembled valve and bottle. Accordingly, the supply of water for the fowl will remain fresh without the need to continually flush, clean and re-fill a bucket, bowl or trough.

It is preferred that the female connection adapter, the receiver and the valve cap comprise a plastic material. Plastics for use in the female connection adapter, the receiver and the valve cap include, but are not limited to polyamides, polyesters and polyolefins.

In a preferred embodiment the valve cap is red. In a more preferred embodiment the valve cap and the receiver are red. In an even more preferred embodiment, the valve cap and receiver are red and the female connection adapter is white. The coloring may be achieved by using materials which are inherently red or white, adding a colorant to the composition used to make that portion of the article or painting or layering a colored material onto that portion of the article. It is believed that the red color draws the fowl with the preferred contrasting red and white colors of the female connection adapter and the receiver/valve cap best attracting the fowl to the apparatus making it more likely that they will drink from the apparatus.

It is preferred that the receiver pin, the ball, the actuating pin and the valve cap insert comprise a metal material. Some of the materials which can comprise the receiver pin, the ball, the actuating pin and the valve cap insert include brass, nickel, steel, stainless steel, copper, bronze and aluminum.

The composition of the receiver pin will have a heat capacity and a thermal conductivity. It has been discovered that by increasing the thermal conductivity of the receiver pin and selecting the receiver pin length dimension so that the receiver pin end extends into the water when the valve is in the closed position, the freezing of the valve can be reduced. The freezing of the valve can be reduced by either lengthening the time it takes to freeze the valve or preventing the freezing of the valve in its entirety. Preferably the thermal conductivity of the receiver pin is greater than 50 Btu/(hr-° F.-ft) at 68° F. In a more preferred embodiment the thermal conductivity of the receiver pin is greater than 100 Btu/(hr-° F.-ft) at 68° F. In a most preferred embodiment the thermal conductivity of the receiver pin is greater than 150 Btu/(hr-° F.-ft) at 68° F. Preferably the receiver pin length dimension is such that greater than about 25% of the receiver pin length extends past the receiver first end and into the water when the valve is in the closed position. In a more preferred embodiment the receiver pin length is such that greater than about 35% of the receiver pin length extends past the receiver first end and into the water when the valve is in the closed position. In a more preferred embodiment the receiver pin length is such that greater than about 50% of the receiver pin length extends past the receiver first end and into the water when the valve is in the closed position. In a more preferred embodiment the receiver pin length is such that greater than about 75% of the receiver pin length extends past the receiver first end and into the water when the valve is in the closed position. In a most preferred embodiment the receiver pin length is such that greater than about 90% of the receiver pin length extends past the receiver first end and into the water when the valve is in the closed position. In a most preferred embodiment the receiver pin comprises copper, with the receiver pin preferably comprising more than 90% copper by weight with the receiver pin comprising more than 99% by weight copper being more preferred and a receiver pin made of 100% copper by weight being most preferred. The receiver pin may also be considered to consist essentially of copper, meaning that there could be trace amounts of other materials including copper oxide.

In an embodiment where the receiver pin is comprised of copper it is preferred that a portion of the receiver pin extend beyond the receiver first end when the valve is in the valve closed position. Preferably the receiver pin length dimension is such the portion of the receiver pin extending beyond the receiver first end when the valve is in the valve closed position is of a greater area and mass than the portion of the receiver pin which does not extend beyond the receiver first end when the valve is in the closed position.

I claim:

1. A valve comprising a valve body and an actuating mechanism wherein
   the valve body comprises a receiver and a valve cap wherein
     the receiver comprises a first end, a second end and a receiver hole wherein the receiver hole passes through the receiver hole from the receiver first end to the receiver second end; and
     the valve cap comprises a first end, a second end and a valve cap hole;
   the actuating mechanism has an actuating pin comprising an actuating pin end, and an actuating pin head which are located on opposing ends of the actuating pin wherein the actuating pin has an actuating pin length dimension;
a receiver pin comprising a receiver pin end and a receiver pin head which are located on opposing ends of the receiver pin wherein the receiver pin has a receiver pin length dimension; and
a ball;
the receiver second end is attached to the valve cap first end, the receiver pin length dimension is configured so that greater than about 25% of the receiver pin length extends beyond the receiver first end when the valve is in the closed position, and the receiver pin is made of a material having a thermal conductivity greater than 50 Btu/(hr-° F.-ft) at 68° F.

2. The valve of claim 1, wherein the receiver pin comprises more than 90% copper by weight.

3. The valve of claim 1, wherein the amount of the receiver pin length dimension that extends beyond the receiver first end when the valve is in the closed position is greater than about 75% of the receiver pin length.

4. The valve of claim 2, wherein the amount of the receiver pin length dimension that extends beyond the receiver first end when the valve is in the closed position is greater than about 75% of the receiver pin length.

5. The valve of claim 1, wherein the amount of the receiver pin length dimension that extends beyond the receiver first end when the valve is in the closed position is greater than about 90% of the receiver pin length.

6. The valve of claim 2, wherein the amount of the receiver pin length dimension that extends beyond the receiver first end when the valve is in the closed position is greater than about 90% of the receiver pin length.

* * * * *